United States Patent [19]
Aylor

[11] Patent Number: 5,425,619
[45] Date of Patent: Jun. 20, 1995

[54] SELF GOVERNING FLUID ENERGY TURBINE

[76] Inventor: Elmo E. Aylor, 498 Hwy. 208, Yerington, Nev. 89447

[21] Appl. No.: 143,471

[22] Filed: Oct. 26, 1993

[51] Int. Cl.$^6$ .............................................. F03D 7/04
[52] U.S. Cl. ........................................ 416/42; 416/44; 416/53; 416/117; 416/118; 416/132 B
[58] Field of Search ................... 415/2.1, 4.1, 4.2, 4.3, 415/4.5, 905, 907, 908; 416/9, 12, 16, 17, 36, 37, 44 R, 44 A, 41 R, 41 A, 42, 46, 53 R, 53 A, 117 R, 117 B, 118, 119, 132 B

[56] References Cited
U.S. PATENT DOCUMENTS
4,048,947 9/1977 Sicard .................................. 416/119
4,781,523 11/1988 Aylor .................................. 415/905

FOREIGN PATENT DOCUMENTS
0909378 5/1946 France .............................. 416/41 A
0126084 7/1984 Japan ................................. 416/119

Primary Examiner—Edward K. Look
Assistant Examiner—Christopher Verdier
Attorney, Agent, or Firm—Charles F. Schroeder

[57] ABSTRACT

A fluid energy turbine has a radial flow rotor in which fluid driven blades are peripherally distributed about a horizontal axis and in which auxiliary biased outlet gates are provided for release of high fluid pressures to govern turbine speed such as in high storm winds. The blades additionally may be made featherable to govern the turbine speed by feathering the blades either preceding or after the gate openings or simultaneously as preset by the degree of biasing of both determined by matching to weather conditions in the area of use. In other embodiments, the gates are interconnected to the featherable blades for coordinated operation by means such as cables or rods.

21 Claims, 4 Drawing Sheets

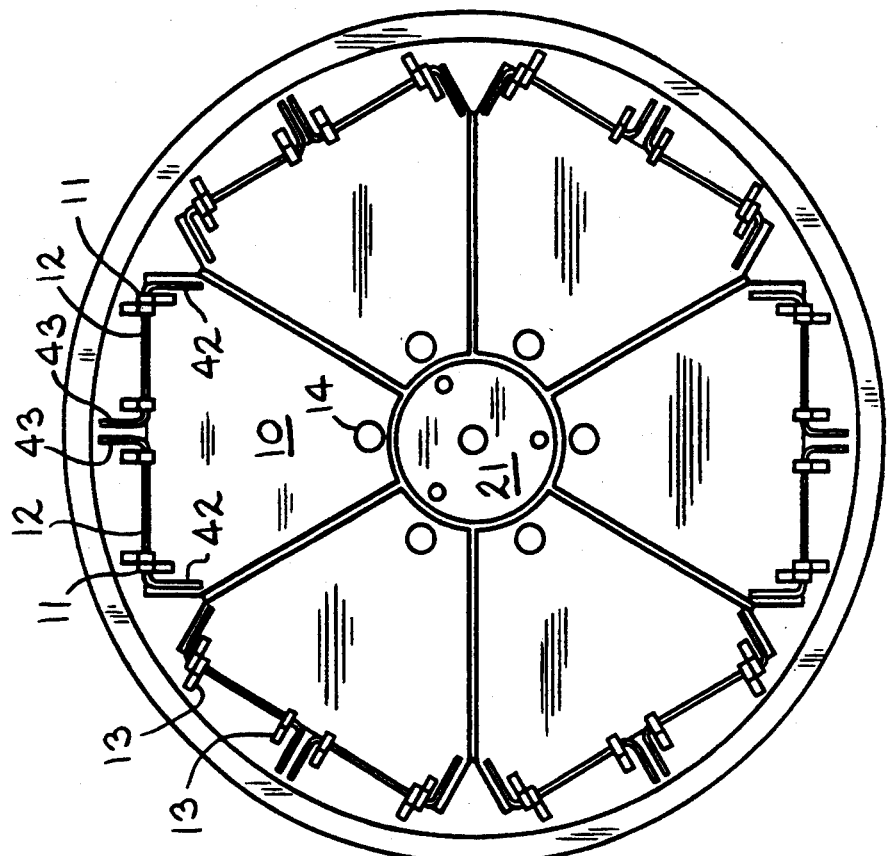
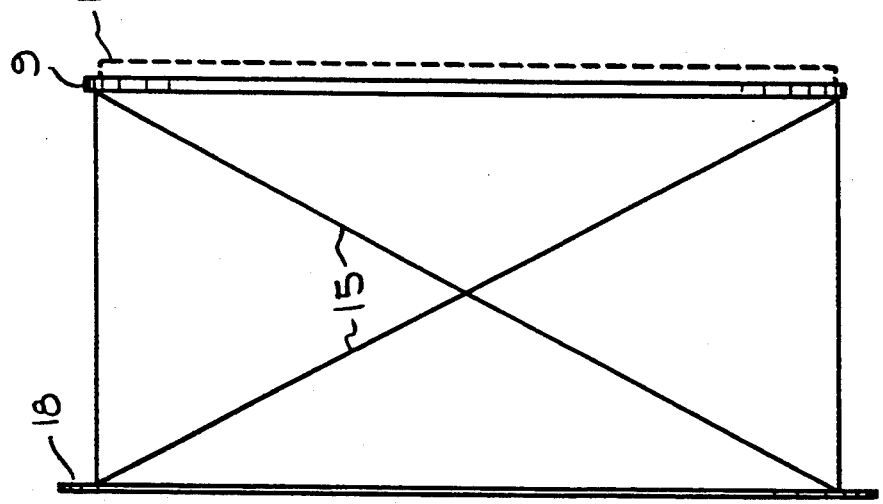

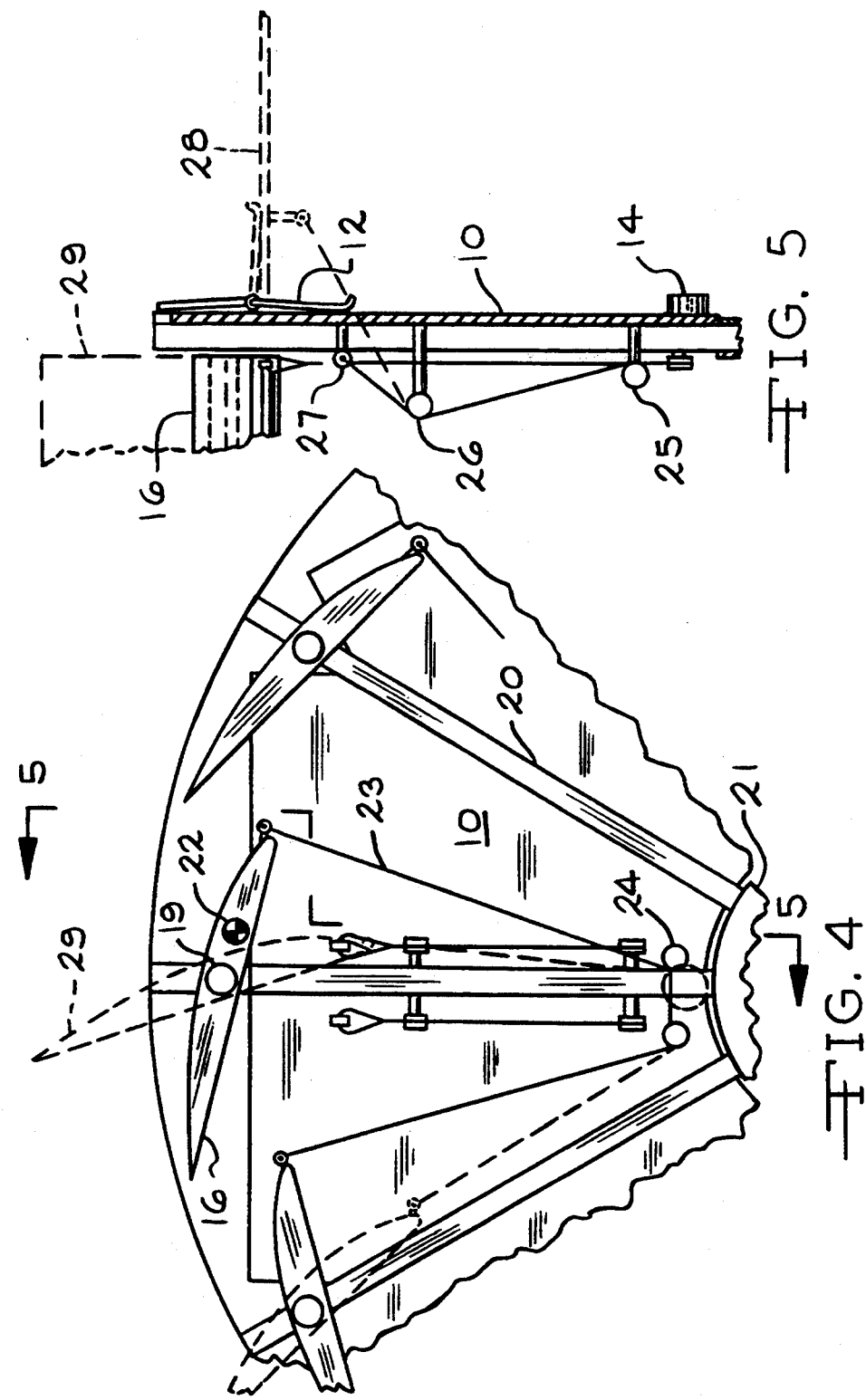

SELF GOVERNING FLUID ENERGY TURBINE

BACKGROUND OF THE INVENTION

For centuries and up to the present, many attempts have been made to increase the conversion efficiency and durability of fluid energy converting machines especially as related to use in natural wind as a prime energy source. The power output of most types so far evolved has been overshadowed by the mass production of energy from gas, coal, oil, hydro-electric and nuclear systems, except in remote regions where the output from mass production energy units is not readily available. In recent years in the United States, especially in California, wind farms have proliferated as a result in part, of technology advancements but largely due to former tax subsidies and remaining legislated regulatory provisions.

Contemporary wind turbines as used in California falter economically when tax subsidies are omitted and suffer additionally from inherent vulnerability to capricious gusting winds and delinquent maintenance programs.

The present invention when applied to a pressure conversion turbine offers high conversion efficiency, low maintenance requirements and minimal vulnerability to wind characteristics which plague contemporary systems.

FIELD OF THE INVENTION

Contemporary turbines designed for operation in natural flowing fluids, such as wind, are generally subject to the need to cope with non-constant velocities, or velocities exceeding design limits. The present invention included a radial flow rotor having a generally axial fluid inlet and fluid outlets between spaced circumferentially distributed blades as well as auxiliary gate outlets and means for controlling flow dynamics and/or for releasing excess flow.

PRIOR ART

Wind turbines of the prior art, in general, have been of two types, namely (1) turbines with radially extending propeller blades having a horizontal axis of rotation and (2) turbines which have a vertical axis of rotation with vertically oriented blades circumferentially spaced about the axis. Hybrid turbines also exist such as the Darrieus rotor turbine which has a vertical axis and blades having both vertical and horizontal directional vectors in a form similar to bowed egg beater type blades extending from spaced points along the axis of rotation.

The invention lends itself particularly to use with radial flow wind turbines represented by the type disclosed in my U.S. Pat. No. 4,781,523 issued Nov. 1, 1988 as well as to use with other wind energy converters wherein air flow channeled to the driving components of the device is adaptable to being bypassed.

SUMMARY OF THE INVENTION

The present invention utilizes a radial flow rotor having a generally horizontal axis of rotation, a forward axial fluid inlet and outlets between a plurality of spaced side-by-side longitudinal fluid engaging blades which have their major directional component extending generally parallel to the rotor axis. In addition a number of auxiliary outlet ports are provided on the aft side of the rotor opposite the inlet side, each of the ports being sealed against fluid flow by a hinged spring-loaded flap or gate which is closed when the rotor is at rest but is fully opened when a predetermined high flow through the outlets occurs while rotating. In addition, each gate flap is optionally balanced by an attached fly weight or counter weight in such a manner as to permit placement of the resultant center of gravity of the gate assembly at a chosen location away from its hinge pivot. The counterweight can be made adjustable in position for the desired location of the center of gravity by making it slidably positional to permit bringing it closer to the hinge pivot axis and thereby correspondingly provide adjustment for predetermined excess fluid pressures. The effectiveness of the counterweight can be minimized by positioning it close to the hinge pivot axis or alternately by removing it from its support, which in either case causes the biasing action on the gate flap to be reliant principally upon the weight of the flap and the hinged spring loading bearing on the gate flap.

When the center of gravity of the flap assembly is positioned away from the hinge pivot, at some combination of the dynamics of fluid flow and rotational speed, the centrifugal force and flow will move each flap away from its respective sealed relation with its outlet port. When it is determined to be desirable the gate flaps can be made to respond principally to fluid flow alone by adjustment or removal of the counterweight.

If fluid velocity continues to increase, dynamic and static pressures then force the flap to further open the auxiliary port, irrespective of zero or counter forces of the center of gravity. Extreme fluid flow conditions, such as are confronted in a storm, will maintain the flap at its limit of travel, leaving the port fully open for maximum "release" of excess flow. These features in general protect the equipment against storm damage and allow continued power generation and R.P.M. control even in high wind conditions that would otherwise require shut-down.

If further protection is needed, such as when the equipment is likely to be subjected to extremely high winds in known hurricane regions, release of flow from the turbine can be provided by incorporating biasing means which will allow the pitch of the rotor blades to first change to a more passive angular disposition at preselected high wind velocities prior to movement of the flaps to an open position. Alternately the gate flaps and the rotor blades may be optionally inter-connected by means such as cables or push rods, so that movement of the gate flaps and one or more blades will move in coordinated patterned relation to different preselected pitch angles matched to the changes in wind velocity.

It is an object of the present invention to provide a fluid energy turbine device capable of efficient conversion of moving fluid energy to useful purposes which surpasses the efficiencies of most other known wind conversion devices, while providing means for governing rotational speed over a wide range of wind velocities.

Another object of the present invention is to provide a low cost durable machine immune to adverse wind conditions and having a low need for maintenance.

A further object of the present invention is to provide means permitting wind power conversion even during high winds or in storms without the usual need under such conditions for total shut down.

A feature of the invention in addition to its capability of operation in extremely high winds is its adaptability to streamlining of air flow thereover for less operational noise than is experienced with open whirling blades which generate tip vortexes.

Other objects and features which are believed to be characteristic of my invention are set forth with particularity in the appended claims. My invention, however, both in organization and manner of construction, together with further objects and features thereof may be best understood by reference to the following description taken in connection with the accompanying drawings in which:

BRIEF DESCRIPTION OF THE DRAWINGS

FIG. 1 is a rear elevational view of a wind turbine rotor assembly incorporating the present invention;

FIG. 2 is a side elavational view of the wind turbine rotor assembly shown in FIG. 1;

FIG. 4 is an enlarged view of the broken away section of the rotor shown in FIG. 3;

FIG. 5 is a side view of the portion of the rotor shown in FIG. 4 as taken at line 5—5;

DESCRIPTION OF THE PREFERRED EMBODIMENTS

Figure 6:
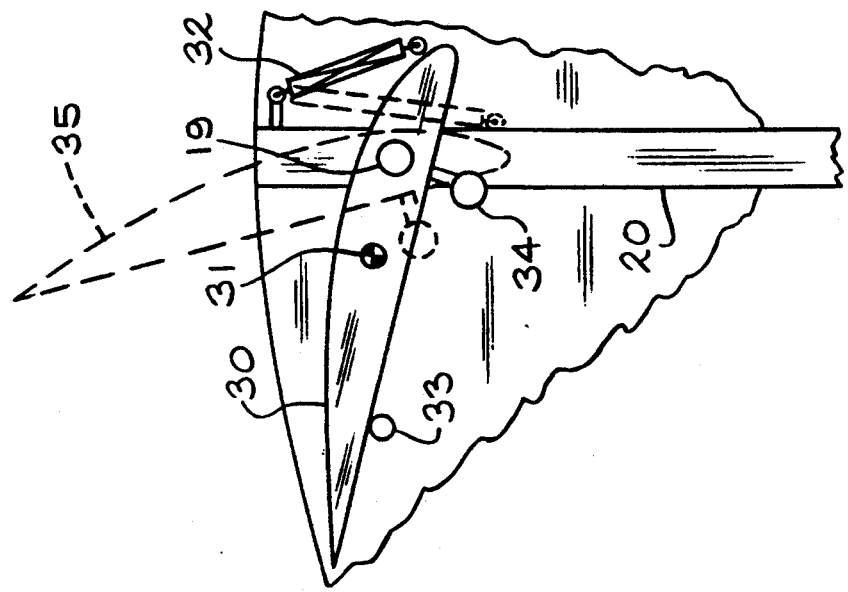
FIG. 6 is a view of a single blade representing an embodiment of the invention incorporating means for passive response to fluid pressure or rotational speed.

Turning to the drawings in greater detail, FIG. 1 is an elevational view of the rear wall of a housing for a radial flow type wind turbine rotor 9 incorporating wind gate flaps 10 according to the present invention. Each flap 10 of the six shown is pivotally supported by hinges 11 circumferentially distributed near the outer edge of the rear wall. Torque bar/hinge pins 12 providing the hinge action are supported by brackets 13. The gate flaps 10 thus pivot at a circumferential base to provide an opening near the axial center of the rotor. A fly weight 14 is illustrated located near the radially inward opening tip of each flap 10. Movement of flap 10 about the hinge axis air causes an outboard arm 42 at one end of the torque bar to follow. Upon such movement caused by wind flow into the turbine, the torque bar 12 is blocked from rotation by a radially outwardly extending arm 43 which bears against the wall of the rotor 9, which imposes a twisting balancing force against the air load acting to open the flap 10.

Figure 3:
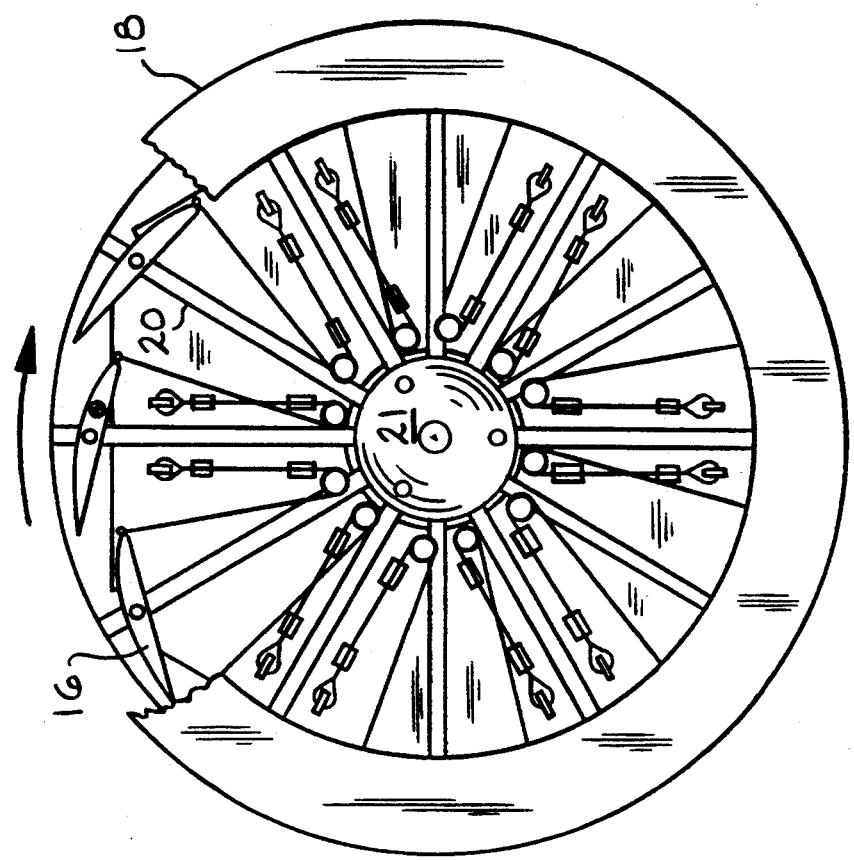
FIG. 3 is a partially broken away front view of the wind turbine rotor of FIG. 1.

FIG. 2 is a side elevation view of the invention shown in FIG. 1 with the large "X" symbol 15 depicting the region occupied by rotor blades 16 shown more clearly in FIGS. 3, 4 and 5. Space 17 represents the region of flaps 10 and their associated torque bar hinge assemblies.

FIG. 3 is a front elevation view of an embodiment of the invention shown in FIG. 1 with a portion of the front entry ring 18 broken away to show three rotor blades 16 and their supporting spars 19. Also shown is an arrangement for interconnecting the flaps 10 and the blades 16 in the form of cable guide pulleys 24 for cables 23; better shown in FIG. 4, whereby the movement of the flaps and changes in the blade pitch angle are coordinated.

FIG. 4 is an enlarged view of the exposed broken away portion of FIG. 3 showing how each blade 16 is pivotally supported on a rod or tube type spar 19 about which the blade can pivot when acted upon by movement by a respective interconnected flap 10. Each pivot spar 19 is in turn supported by a respective radially extending spoke of a series of spokes 20. Alternate spokes in the series are arranged to match and cover the spacing between adjacent pairs of flaps with which it is associated. The alternate spokes are arranged to function as a flap seat to block air flow between the closed flaps and the spokes 20. The gate flaps 10 are normally closed when the rotor is at rest and are arranged to remain closed up to a preselected level of fluid pressure and/or up to a preselected rotational speed of the rotor 9. The aerodynamic center 22 of the blades is arranged, by appropriate positioning of their pivots and by contouring, to be ahead of their spars 19, which results in application of a counterclockwise lift torque on the blades at preselected air flow speeds. This torque acts to transmit the lift torque force of each blade to its gate flap 10 by way of a cable system including a cable 23 anchored at the leading edge of blade 16, around pulley 24, and then, as shown in FIG. 5, in succession over pulleys 25 and 26 to a connection 27 on its respective flap 10. Thus the aerodynamic loads acting on the blades 16 establish a balanced relation with the biasing action of torque bars 12 to provide an open operating position of their respective flaps 10 matched to the air flow velocity and speed of rotation of the rotor.

At a chosen preselected air pressure, flap 10 will be forced to break its air sealing contact over its exit port formed with spokes 20, thus allowing passage of air from the rotor. This in turn reduces the static pressure inside the radial flow rotor and consequently reduces the driving torque which would otherwise be produced by the rotor from stronger winds. On the other hand a high wind flow movement of the flaps 10 is transmitted by connecting cables 23 to their respectively associated blades 16 to increase the pitch of the blades during rotor rotation. This increases the gap between blades 16 which further vents air from the rotor interior and reduces internal static pressure.

The steeper pitch of the blades 16 also acts to reduce the rotational speed of the rotor 9 which action continues progressively with increasing wind speeds. At the same time centrifugal force acts on the fly weights 14 to open the flaps which accentuates the action so that ultimately, when the wind is sufficiently strong, the flaps 10 move to a fully open position 28 corresponding to a maximum pitch position 29 of the blades 16. The effects of the aforementioned extreme limit positions of the open flaps 10 and feathered blades 16 are a reduction in loading on the rotor and drag load on a support tower with a reduction in rotational speed relative to the wind velocity.

FIG. 6 depicts an embodiment of the invention in which passively responsive blades 30 are not interconnected to the gate flaps 10 but are self feathering. In this embodiment, the aerodynamic center 31 of the blade 30 is designed by contouring to be located aft of spar 19. The aerodynamic load acts to move the blade clockwise which movement is resisted by a spring 32 anchored to the rotor 9 and connected to blade 30 near its leading edge. A stop member 33 limits the counter clockwise movement of blade 30. A flyweight 34 is provided secured in standoff relation to the underside of the blade which by reason of centrifugal force of rotor rotation acts on the weight to supplement the action of the aerodynamic load. The centrifugal force acting on the weight 34 becomes progressively more dominant as the pitch angle of the blade increases and the aerodynamic force is diminished by reason of a resulting progressively smaller angle of attack on the blades 30. Thus as wind and/or rotational speed of the rotor 9 increases the blade pitch angle ultimately achieves a limit position of the blade 30 illustrated in dashed lines and referred to by the reference numeral 35 which results in a reduced loading on the rotor. It will be recognized that the rotational direction of the rotor depicted by the curved vector arrows is reversible by reversing the pitch angle of the blades.

Figure 7:
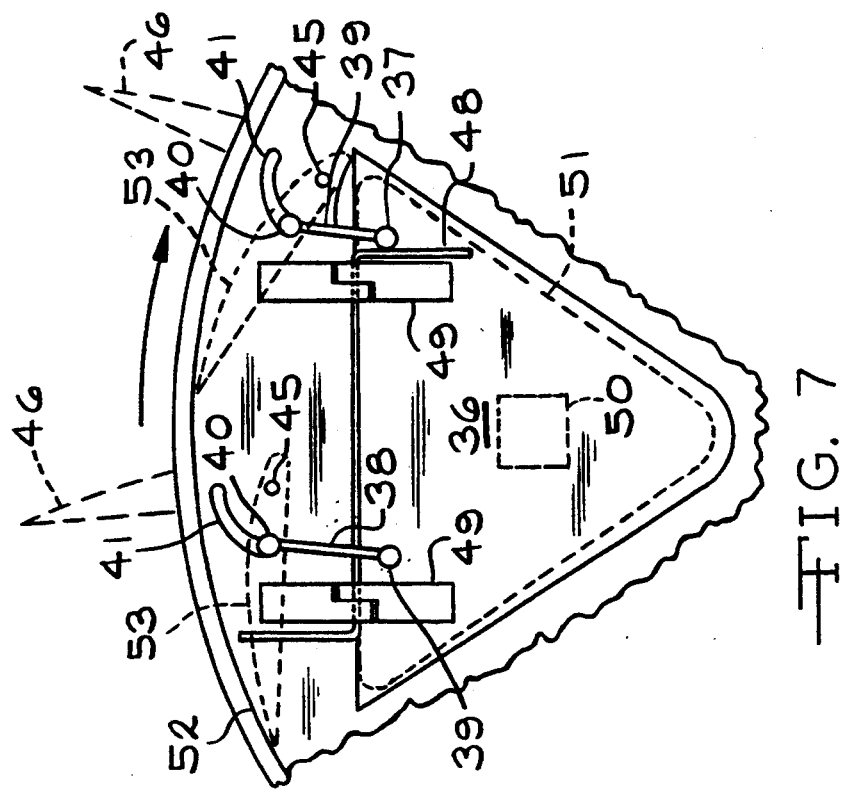
FIG. 7 is an enlarged fragmentary view of another embodiment of the rotor of FIG. 1 wherein wind actuated flaps are interconnected by push rods by which the position of the flaps coordinated with the pitch of the adjustable blades of the rotor.
Figure 8:
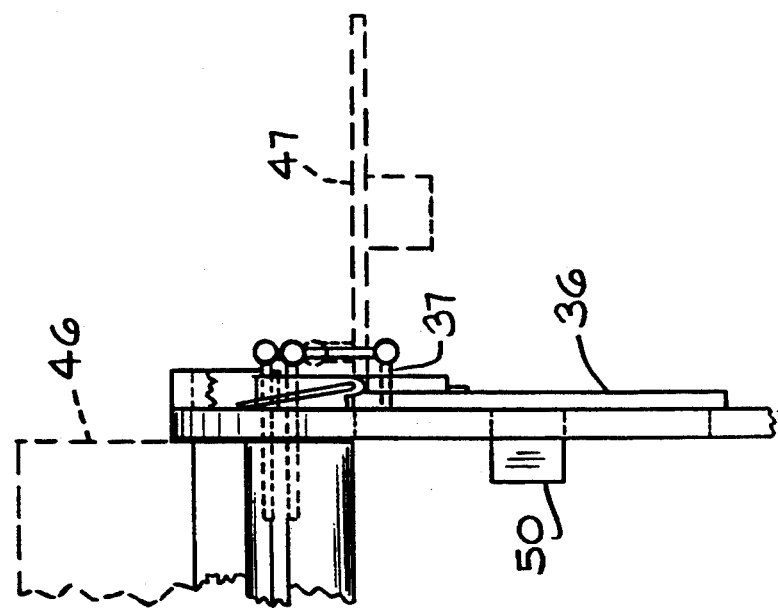
FIG. 8 is a side elevation view of the portion of the rotor shown In FIG. 7.

FIG. 7 depicts another embodiment of the invention incorporating a system of rigid connecting members such as rods for interconnection of gate flaps 36 to blades 53. As exemplified with a single flap, interconnecting rods 37 extending from a flap 36 are connected by linking members 38 and 39 to bars 40 projecting from the end of each of the blades 53 through arcuate slots 41 in the rear wall of the rotor 52. When the flow-gate flap 36 is opened, each of the blades 53 is caused to move about a connected pivot spar 45 near the leading edge of the blades to increase the ultimate pitch angle. This position is shown in dotted lines at a position 46 when the flap 36 is raised to the dotted line position 47 also shown in FIG. 8. A torque spring 48, supported by a pair of hinge brackets 49 hold the gate flap 36 closed against a flow-port 51 of the rotor 52 at low wind speeds. Optionally a counterweight 50 can be provided on the flap 36 depending upon weight of the flap and the design performance desired of the rotor 52.

In operation the flaps 36 are spring biased to initially open at a predetermined air pressure but as the rotor rotates, centrifugal force of rotation of the rotor assembly and flaps assists in opening the flaps still further. Release of the energy of high winds is thus effected by the centrifugal force which acts on the gate flap assembly to function as a governor in limiting the effects of high winds. In other words, when a high wind is present, the wind first acts against the biasing action of the springs which hold the gate flaps closed but, as rotation builds up, the centrifugal force of rotation acting on each flap assembly opens the flaps still further and releases the additional effects of the wind which would otherwise cause increased speed of rotation. A balance is thus established between a release of high winds through the flaps and the centrifugal force of rotation of the flaps 36. That is, the centrifugal force of a flap and counterweight assembly is reduced by rotor speed reduction caused by the by-pass of air through the flaps 36 rather than allowing its passage through the blades 16 thereby resulting in regulation of rotational speed.

In addition to such by-pass of air through the gate flaps 36 for regulation of speed, the blades 53 can be made automatically adjustable in position to adjust the amount of air passing between them. In this regard by biasing each of the featherable blades, such as with a spring, a predetermined pattern of different degrees of release of air between them can be established at different rotor speeds. That is, by providing for automatic feathering of the blades, the effect of high wind forces, which would otherwise cause a higher speed of rotation, can be subdued.

Three mechanisms are thus operable for regulation of the speed of a rotor under high winds. The mechanisms which can be arranged to function simultaneously or in sequence are namely the openable gate flap, the featherable blades and the positionable fly weights. Opening of the gate flaps 36 at the rear of the rotor for air release can be arranged to occur simultaneously with feathering of the blades 53 or operated in sequence one before the other or both together depending upon the tension of springs associated with each to regulate the speed of rotation of the turbine. In this regard, the blades and flaps can be arranged by selective adjustment of components dependant on weather experience in the specific region of use, that as wind velocity increases, feathering of the blades will be initiated before or after the flaps begin to open or simultaneously with the flaps or either the flaps or the blades first open to their maximum opening position before the other begin to open.

The flaps can be arranged to function responsive to the rotational speed of the rotor by providing a balancing counterweight 50 mounted on the back of each of the flaps 36. The centrifugal force of rotation of the flaps 36 and counterweights 50 in combination can be arranged to act to open the flaps 36 according to a rotational speed pattern determined by the position of the counterweights 50 with their respective gate flaps 36. In this respect the counterweights 50 each can be made adjustable in their position on their respective gate flap 36 both in their degree of projection from the back of the gate flap as well as their height position relative to the pivot line of the gate flap. As the flaps move out during rotor rotation, the moment arms of the counterweights about the flap hinges increase and their radius of rotation about the rotor axis also increases. The biasing springs acting on the flaps 36 in combination with the fly weights may therefore be selected and adjusted to exert a non-linear force with changes in rotor speed to avoid immediate full opening of the flaps and to avoid requiring a very low rotational speed to restore closure. The centrifugal force of the mass of the gate flap 36 and its associated counterweight 50 can thereby be varied in its effectiveness in dumping of air to regulate rotational speed of the rotor 52. Accordingly desired patterns of operation can be established as determined by trial and error adjustment and positioning of the fly weights 14.

Under still other circumstances such as for low level maximum wind conditions which might be calculated as likely to prevail in a region, the counterweights mounted on the flaps might be deleted and the biasing action of the spring 48 alone acting on each gate flap might be found adequate to provide the range of adjustability necessary to effect full opening of the flaps under the highest winds to be confronted.

In view of the foregoing it will be understood that many variations of the disclosed invention can be made within the broad scope of the principles embodied therein. Thus while particular preferred embodiments have been shown and described, it is intended by the appended claims to cover all such modifications which fall within the true spirit and scope of the invention.

I claim:

1. An air driven turbine comprising a rotor rotatable about an axis of rotation, a plurality of spaced side-by-side air engaging blades, said blades each having major dimensional component extending generally parallel to the axis of rotation of said rotor and spaced about said axis, said rotor having an axial flow inlet for receipt of air within said rotor and for release through slot spaces between said blades, said rotor having auxiliary air outlet means, said auxiliary outlet means being normally closed and arranged to open responsive to pressures above a predetermined level of air pressure occurring within said rotor.

2. An air driven turbine as set forth in claim 1 wherein said auxiliary air outlet means is located on the side of said rotor opposite said inlet.

3. An air driven turbine as set forth in claim 2 wherein said auxiliary fluid outlet means comprises pivoted gate in said side of said rotor.

4. An air driven turbine as set forth in claim 3 wherein the gates of said outlet means are held normally closed by biasing means.

5. An air driven turbine as set forth in claim 4 wherein said biasing means comprises a spring means.

6. An air driven turbine as set forth in claim 4 wherein said biasing means includes a counterweight on each of said gates supported in offset relation from the pivot of its respective gate whereby the opening of said gate is additionally responsive to centrifugal force acting on said counterweight.

7. An air driven turbine as set forth in claim 1 wherein said blades are each pivotable about a longitudinal pivot axis and are arranged for progressive feathering to a greater degree as air pressure within said rotor increases above said predetermined level.

8. An air driven turbine as set forth in claim 7 wherein said blades include biasing means acting to bias said blades toward a normally close spacing therebetween.

9. An air driven turbine as set forth in claim 8 wherein said blades are arranged to initiate feathering of said blades to a more open space therebetween at a predetermined air pressure level within said rotor which is less than the air pressure effective to begin opening said auxiliary air outlet means.

10. An air driven turbine as set forth in claim 8 wherein said blades are arranged to initiate feathering to a more open space therebetween at a predetermined air pressure level within said rotor which is greater than the air pressure effective to begin opening said auxiliary air outlet means.

11. An air driven turbine as set forth in claim 8 wherein the biasing means for said blades comprise spring means.

12. An air driven turbine as set forth in claim 11 wherein said biasing means comprise a flyweight supported on each of said blades in projecting offset relation from its pivot axis, said flyweight being arranged to act cooperatively with said spring means in determining the degree of feathering of said blades under high air pressure rotation of said rotor.

13. An air driven turbine as set forth in claim 11 including means interconnecting said blades and said auxiliary outlet means for coordinating operation of said blades with said auxiliary outlet means for regulating the rotational speed of said rotor under different wind conditions.

14. An air driven turbine as set forth in claim 13 wherein said interconnecting means comprises a cable system interconnecting said auxiliary outlet means and said pivotable blades.

15. An air driven turbine comprising a rotor having a generally horizontal axis of rotation comprising, a plurality of side-by-side air engaging blades to drive said rotor, each said blade having a major dimensional component extending generally parallel to the axis of rotation of said rotor and spaced about said axis, said rotor having an axial air flow inlet for receipt of air within said rotor for release through spaces between said blades, said rotor including biased auxiliary air outlet means which are normally closed and arranged to open responsive to predetermined excesses in air pressure occurring within aid rotor.

16. An air driven turbine as set forth in claim 15 including means for feathering said blades comprising a pivot axis for each and means for effecting a feathered orientation of said blades about the pivot axis of each matched to predetermined air pressures.

17. An air driven turbine as set forth in claim 16 including means interconnecting said blades and said auxiliary air outlet means and means coordinating operation of said blades and outlet means for governing speed of rotation of said rotor under different wind conditions.

18. An air driven turbine as set forth in claim 17 wherein said interconnecting means comprises a cable system.

19. An air driven turbine comprising a rotor including a plurality of side-by-side air engaging blades to drive said rotor, said rotor having an inlet for receipt of air for release through spaces between said blades, said rotor including auxiliary air outlet means which are normally closed and arranged to open responsive to predetermined excesses in air pressure occurring within said rotor.

20. An air driven turbine as set forth in claim 19 including means for feathering said blades comprising a pivot axis for each, and means for effecting a feathered orientation of each of said blades about its pivot axis matched to predetermined air pressures.

21. An air driven turbine as set forth in claim 20 including means interconnecting said blades and said auxiliary air outlet means and means coordinating operation of said blades and said auxiliary air outlet means for governing the rotational speed of said rotor under different wind conditions.

* * * * *